(No Model.) 6 Sheets—Sheet 1.

L. S. CAMPBELL & I. WOODRING.
CORN HUSKING MACHINE.

No. 552,606. Patented Jan. 7, 1896.

Fig. 1

WITNESSES:

INVENTORS
Lawrence S. Campbell
Isaac Woodring
BY
ATTORNEYS.

(No Model.)

L. S. CAMPBELL & I. WOODRING.
CORN HUSKING MACHINE.

No. 552,606.

Patented Jan. 7, 1896.

WITNESSES:

INVENTORS
Lawrence S. Campbell
Isaac Woodring
BY
ATTORNEYS.

(No Model.) 6 Sheets—Sheet 3.
L. S. CAMPBELL & I. WOODRING.
CORN HUSKING MACHINE.

No. 552,606. Patented Jan. 7, 1896.

WITNESSES:

INVENTORS
Lawrence S. Campbell
Isaac Woodring
BY
ATTORNEYS.

(No Model.) 6 Sheets—Sheet 5.

L. S. CAMPBELL & I. WOODRING.
CORN HUSKING MACHINE.

No. 552,606. Patented Jan. 7, 1896.

WITNESSES:

INVENTORS
Lawrence S. Campbell and
Isaac Woodring
BY
ATTORNEYS.

(No Model.) 6 Sheets—Sheet 6.

L. S. CAMPBELL & I. WOODRING.
CORN HUSKING MACHINE.

No. 552,606. Patented Jan. 7, 1896.

WITNESSES:

INVENTORS
Lawrence S. Campbell
Isaac Woodring
BY
ATTORNEYS.

UNITED STATES PATENT OFFICE.

LAWRENCE S. CAMPBELL AND ISAAC WOODRING, OF WAVERLY, IOWA.

CORN-HUSKING MACHINE.

SPECIFICATION forming part of Letters Patent No. 552,606, dated January 7, 1896.

Application filed November 25, 1893. Serial No. 491,963. (No model.)

*To all whom it may concern:*

Be it known that we, LAWRENCE S. CAMPBELL and ISAAC WOODRING, citizens of the United States, residing at Waverly, in the county of Bremen and State of Iowa, have invented certain new and useful Improvements in Corn-Husking Machines; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention consists of an improvement in the apparatus for husking corn, and is adapted particularly for treating green corn preliminary to preparing it for eating or canning purposes.

The principal object of the invention is to provide a machine which will divest the corn of its husk in a quicker and more efficient manner.

A further object is to husk the corn without bruising or tearing the grains.

Various other objects are contemplated by our invention, and which will fully appear hereinafter.

Referring to the accompanying drawings, which illustrate the machine for carrying out our invention.

The letter A indicates the frame of the machine; $a$, the drive-shaft to which the power for operating the machine is applied by means of the crank-wheel $a'$. If the conditions attending the machine will admit, the crank-wheel $a'$ may be substituted by a pulley. The drive-shaft extends longitudinally of the machine and is journaled in the boxes $a^2$ and $a^3$. Box $a^2$ is fixed rigidly to one of the cross-bars $A^2$ of the frame A, while the box $a^3$ is firmly secured or formed integral with the post or upright B, which is in turn rigid with the frame A. This bar and its functions will be more fully described hereinafter.

The drive-shaft $a$ extends a short distance beyond the box $a^3$ and is provided at a point near its extremity with a circular cutter $B'$, which is fixed thereto so as to revolve in unison with the shaft. Secured rigidly to this shaft and one on each side of the cutter $B'$ are the pulleys $B^2$, which are of such a radius as to leave but a small portion of the cutter $B'$ exposed, in practice probably one-third of an inch. Over these pulleys the carrier-belts $B^3$ are arranged and the belts extend parallel with each other to the pulley $B^4$ journaled in the box $b$, which is in turn adjustably secured to the right-hand side of the frame by means of the transverse slots $b'$ and screws $b^2$. The belts $B^3$ are driven by the pulleys $B^2$ and are adapted to carry the corn to be husked to the slitting-cutter $B'$ and its companion $b^3$. This latter cutter $b^3$ is fixed to the inner end of the shaft $b^4$ and directly above the cutter $B'$, rollers C being fixed to the shaft $b^4$ on each side of the cutter, which serve to gage the depth at which the cutter may enter the corn-husks. The shaft $b^4$ extends parallel with the shaft $a$, and is so arranged that its rear end carrying the cutter $b^3$ may have a limited vertical movement so as to accommodate the various sizes of the ears of corn that the cutters will act upon. To this end the shaft in question is journaled in the two boxes $C'$ and $C^2$, the former $C'$ being fixed to or formed integral with the rock-bar $C^3$, which is in turn journaled in one of the standards $A'$ of the frame A, and in the vertical arm $C^4$ arising from one of the cross-bars $A^2$, so as to be capable of a limited oscillatory movement, while the box $C^2$ is arranged in a vertical slot $c$ of the post or upright B, so as to be capable of movement therein, and the box is given a normal tendency toward the lower end of the slot by means of the rod $c'$ fixed to the box and extending vertically through the opening $c^2$, and provided with a spring $c^3$ whereby the box and rod attached are pushed down only to be lifted by overcoming the force of spring $c^3$. By this means it will be seen that the cutter $b^3$ may be lifted from the cutter $B'$ a limited distance and that, owing to its relation to the spring $c^3$, it is always attended by force enough to make it act properly on the corn being passed under it. Fixed to the shaft $a$ at a point near the box $a^2$ is a pinion $c^4$ which meshes with the pinion $c^5$ of the shaft $b^4$, and by means of the two motion is transferred from the shaft $a$ to the shaft $b^4$. It will be understood that these gears $c^4$ and $c^5$ will engage each other at all times, irrespective of the vertical play allowed to the rear end of the shaft $b^4$, for it will be obvious that this vertical movement will be hardly appreciable at the pivotal point of the shaft or the box $C'$, and that the small amount of play which is present will affect in no way the coaction of the pinions $c^4$ and $c^5$.

Fixed to the shaft $a$ just inside the bearing $a^3$ and revolving therewith is a bevel-gear D, which meshes with a corresponding gear $D'$ fixed to the upper end of the vertical shaft $D^2$. This shaft $D^2$ is journaled in the boxes $D^3$, each fixed to the upright B and one of the frame-standards $A'$, and the shaft extends down to a point near the lower portion of the machine. Secured to the lower extremity of the shaft $D^2$ is a second beveled pinion $D^4$, which meshes with a similar pinion $d$ fixed to the horizontal shaft $d'$, which shaft is journaled in boxes $d^8$ of the adjacent frame-standard $A'$. By this means motion is transmitted from the shaft $a$ to the shaft $d'$ *via* the shaft $D^2$ and connecting-gears.

Keyed to the shaft $d'$ at a point midway its bearings is a large belt-pulley $d^2$ over which a band or belt $d^3$ operates, and this belt $d^3$ extends to the pulley $d^4$ of the shaft E. The shaft E is journaled in the horizontal frame $E'$ formed by two parallel bars secured to two of the standards $A'$ and to a similar number of counter-braces $A^2$ and projecting forward at the front standard A for a slight distance. The shaft E extends across the frame $E'$ and has the saw-toothed or circular cutter $E^2$ fixed to its outer end and projecting above the frame.

Journaled in the front extremity of the frame $E'$ by means of the arms $E^3$ is a drum $E^4$ over which one end of the carrier $e$ operates, the carrier extending the entire length of the frame and between the side bars thereof.

The rear or remaining end of this carrier operates over a drum $e'$ similar to the drum $E^4$. This drum $e'$ is journaled in the short arm $e^2$, which is in turn secured to the frame of the machine by means of the elongated slot $e^3$ and screw $e^4$, and in the box $e^5$ fixed to the bar B, whereby the drum may be adjusted toward and from its companion and the tension of the conveyer or carrier $e$ regulated. The carrier $e$ is provided on its outer side with the ribs or flanges F, equidistant from each other and adapted to have the corn to be husked placed across the belt and between each two ribs.

Fixed to the left-hand extremity of the shaft $d'$ is a pinion $F'$ which meshes with the spur-gear $F^2$ of the horizontal shaft $F^3$, whereby the latter shaft is revolved. This shaft is journaled in the boxes $F^4$ on the frame of the machine and has fixed to its left-hand end beyond the bearings a small drive-pulley $f$, over which the belt or band $f'$ operates. $f^2$ indicates a large band-pulley driven by the belt $f'$ from the pulley $f$, and the pulley $f^2$ is fixed to the left-hand extremity of the shaft $f^3$, which is in turn journaled in the arms $f^4$ and G, which arms extend out rearwardly from the frame of the machine. The arm $f^4$ projects out horizontally and is braced by the arm $G'$, which is fixed to its end and to the frame of the machine below the arm $f^4$, while the arm G is curved in the arc of a circle, first up above the frame and thence down to the level of the shaft $f^3$. The purpose of this peculiar construction will be apparent later on. The remaining or right-hand end of the shaft $f^3$ is provided outside of its bearings with a second band-pulley $G^2$ which co-operates with the band $G^3$, and whereby power is transmitted to the shaft $G^4$ through the medium of the pulley $g$ fixed to its left-hand end. Shaft $G^4$ is that which carries the drum $e'$, and is journaled, as before explained, in the arm $e^2$ and box $e^5$, whereby the drum $e'$, and hence the carrier $e$, is operated.

Secured firmly to the shaft $f^3$ between and directly adjacent to its bearings are the disks $g'$, which are two in number, and have formed integral with their peripheries the studs $g^2$, equidistant from each other and provided with the indentations or notches $g^3$ at their ends. Journaled in the bearings $g^4$, which bearings are adjustably secured to the front portion of the machine by means of the slot-and-screw connection H, is a revolving shaft $H'$, to which is affixed the disks $H^2$, similar to the disks $g'$ in shape and size. Over these disks $g'$ and $H^2$ the endless carrier or conveyer $H^3$ operates. This carrier consists of two chains $H^4$ formed of short sections of wire bent first in the shape of an elongated U, and having each arm of the U bent around the base or horizontal portion whereby the sections are connected and a chain with regular cross-bars $h$ is formed. Cross-bars $h$ are adapted to be related to the disks $g'$ and $H^2$ that they will match with the notches $g^3$ of each disk, so as to form a positive connection between the chain and the disk $H^2$ to be driven.

Rigidly secured to each link or section of the chains $H^4$, and midway the bars $h$, are the eyes $h'$, which are directly opposite each other on the two chains and are adapted for the reception of the pivots $h^2$ of the pivoted carrying devices $h^3$. These devices $h^3$ are formed of a sheet of metal bent longitudinally at right angles with the portion $h^4$, larger and consequently heavier than the other, which fact will give that portion a tendency to hang down vertically. This, however, is prevented by the fingers I, which are secured rigidly to each of the portions $h^4$ and which bear against the device directly in front of the one to which it is attached, whereby each of such devices is supported by its neighbor, when they occur on the upper side of the disks $g'$ and $H^2$; but when they are carried on the under side of the disks the operations of the fingers I cease, and the heavy portion $h^4$ would drop down but for the supports or tracks $I'$ and $I^2$ upon which such portions rest and travel. The track $I'$ is secured to one of the cross-bars $A^2$ at the left-hand front of the machine and extends upwardly until the level of the lower periphery of the disks $g'$ and $H^2$ is reached, where it changes its course and proceeds rearwardly and downwardly parallel with the lower half of the carrier until the rear end of such is reached, whereupon it curves around and up the rear left-hand disk $g'$ to the level of the upper half of the carrier, where it ends. The track $I^2$ is arranged under the right-hand edge of the carrier and begins at a point near the latter's rear end. From this point it follows the carrier and curves up and around the rear end, as was the case with the companion track $I'$. Thus it will be seen that by means of the tracks $I'$ and $I^2$ the heavy portions $h^4$ of the carrying device $h^3$ are supported during their passage on the under side of the disks $g'$ and $H^2$, excepting at the points directly over the husk-stripping devices, where the track $I^2$ and the devices $H^3$ are constructed so as to leave the carrying devices or sections $h^3$ without support and hence allow them to drop.

The carrier $H^3$ is adapted to receive the ears of corn after having been slit longitudinally by the knives $B'$ and $b^3$ and to carry such corn to the devices for stripping it of the cut husks. Now it is for this reason that the peculiar construction attending this part of the invention is employed, so that the corn may be carried to the husk-strippers and then automatically dropped into them.

The letters $I^3$ and $I^4$ indicate two stripping devices which are arranged below the carrier $H^3$, and the carrier is adapted to drop alternately into one stripper and then into another. To attain this end every other one of the carrying devices $h^3$ is constructed on its left-hand end shorter than those adjoining, and the track $I'$ is constructed with two notches $i$ and $i'$ in its edge, which are so related to the left-hand ends of the carrier devices $h^3$ that when the devices whose ends have been shortened pass over the opening $i$ the shortened end will clear the side of the notch and allow the heavy portion of the bucket or carrying device $h^3$ to drop to a vertical position and thereby deliver the corn to the stripper $I^3$ or the one which is near the rear end of the machine. Owing to the increased length of the buckets or carrying devices $h^3$ that have not been shortened these will pass the notch $i$, but the notch $i'$ over the stripper $I^4$ is so formed that the edge of the carrying device will clear it and drop, as did the shortened ones when they reached the notch $i$, and deliver its contents into the stripper $I^4$. Thus it will be seen that when an ear of corn is fed to every one of the sections or devices $h^3$ the corn will be conveyed to the strippers and one ear dropped into the stripper $I^3$, for example, while the next or contiguous ear is dropped into the stripper $I^4$, and so they alternate until all the corn has been acted upon.

Figure 1:
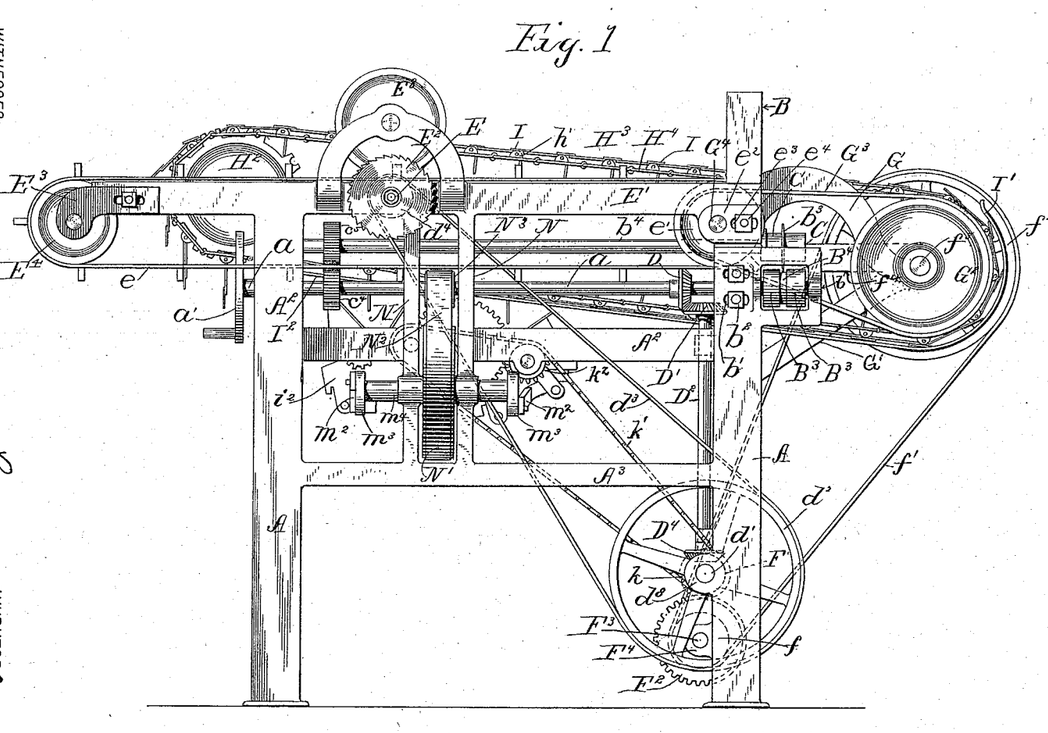
Figure 1 represents a side elevation thereof.
Figure 2:
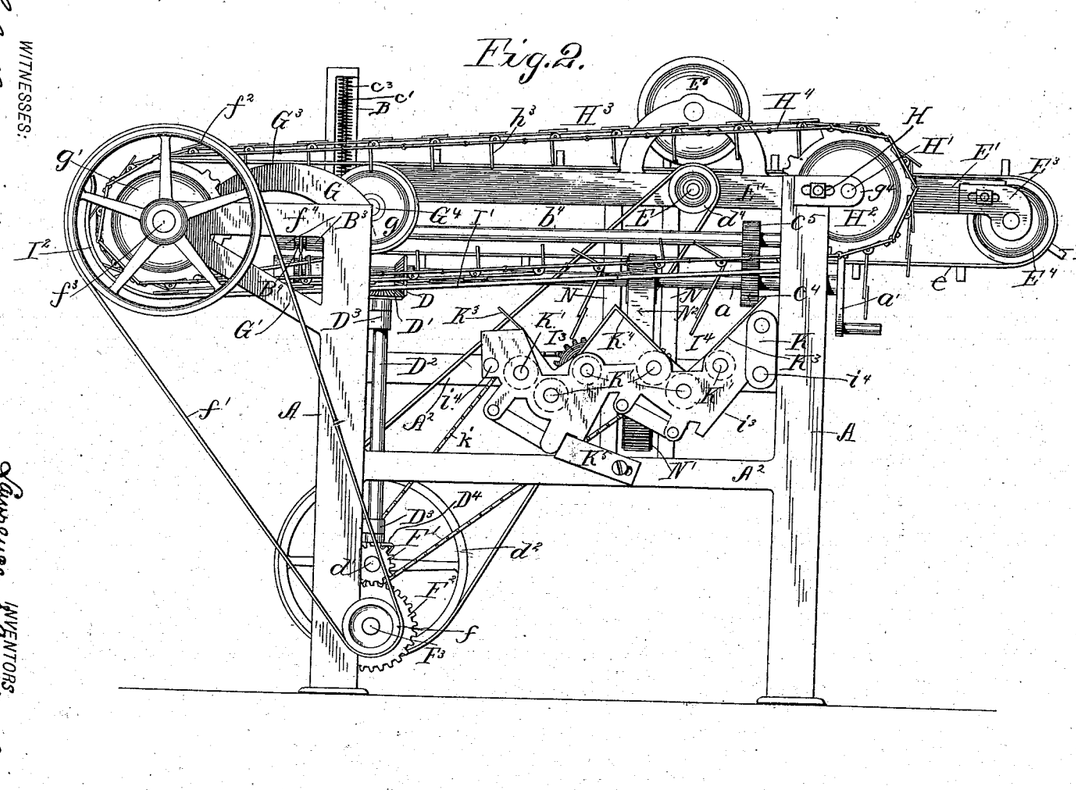
Fig. 2, an elevational view of the left side.
Figure 3:
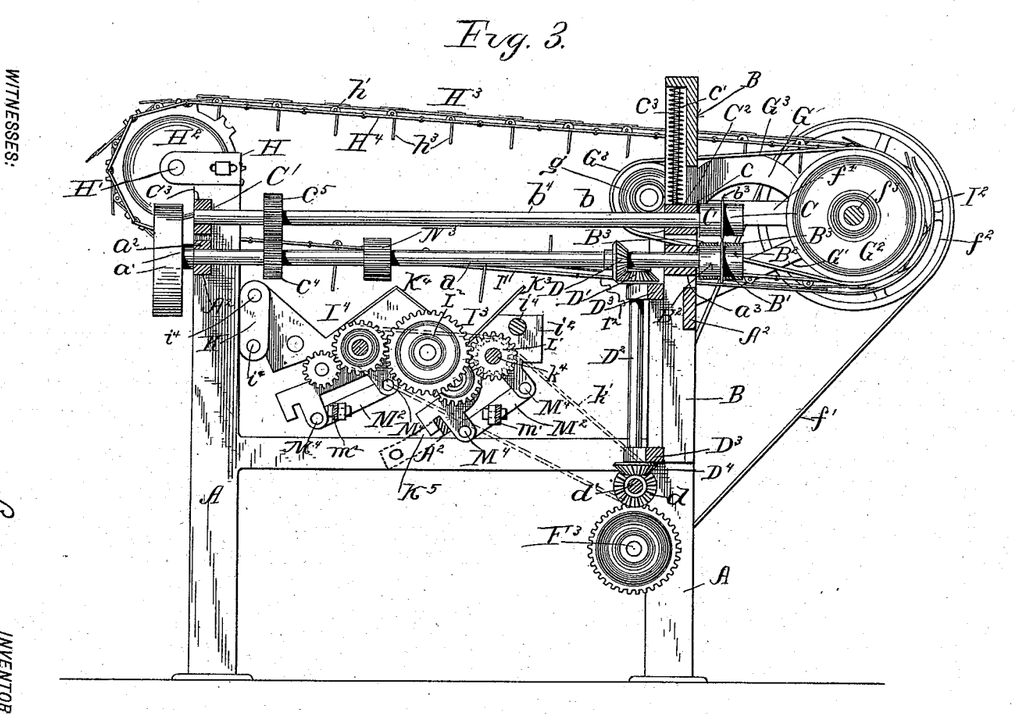
Fig. 3, a similar view of the opposite side partly in section.
Figure 4:
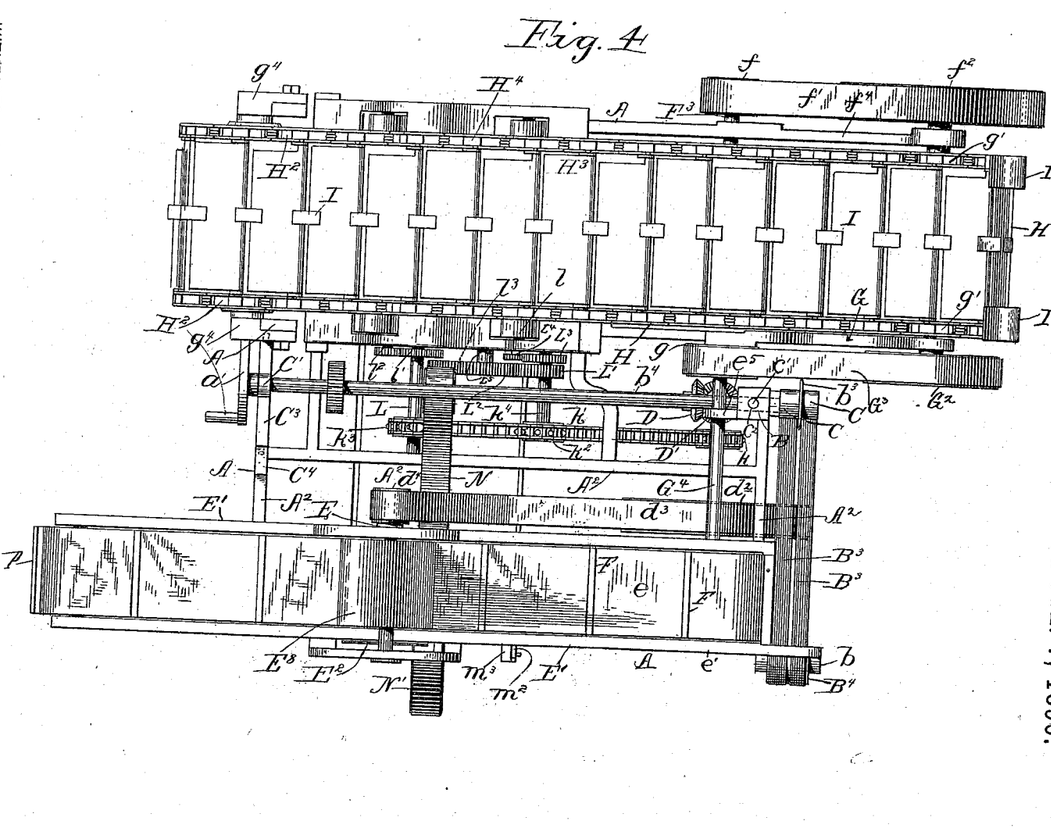
Fig. 4, a plan view.
Figure 5:
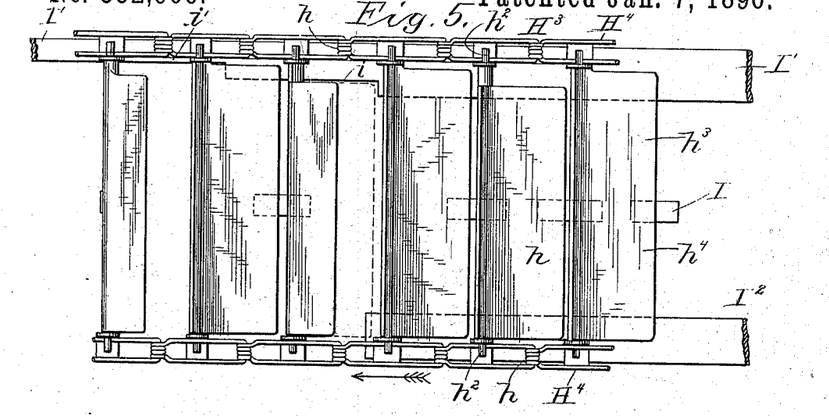
Fig. 5 is a plan view of a portion of the conveyer having the pivoted sections and the support for releasing the pivoted sections alternately.
Figures 6, 7:
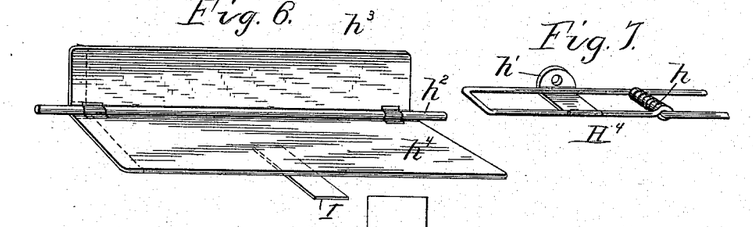
Fig. 6 is a detail view of a pivoted section.
Fig. 7 is a detail view of a portion of the chain or band by means of which the pivoted sections are supported.
Figure 8:
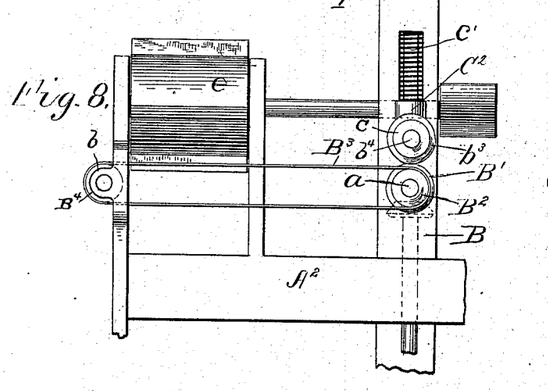
Fig. 8 is a detail view of the cutters for severing the husks longitudinally, the conveyer operating with the cutters, and the initial conveyer for carrying the ears to the butt-cutter.
Figure 9:
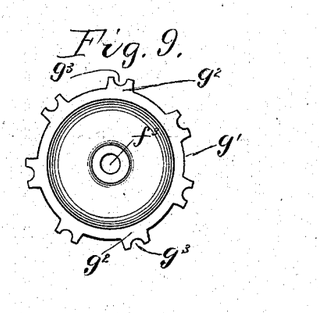
Fig. 9 is a detail view of a sprocket-wheel for supporting the chain or band of the conveyer having the pivoted sections.
Figure 10:
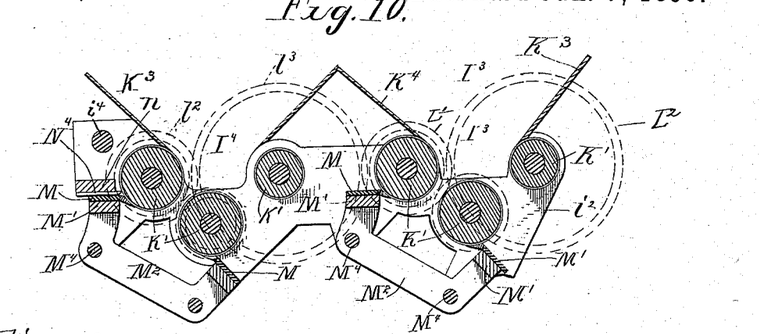
Fig. 10 is a detail view of the stripping mechanism.
Figures 11, 13:
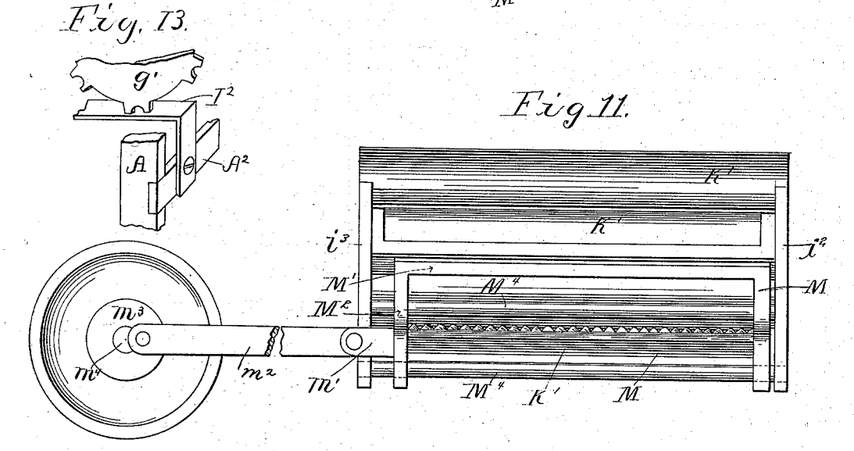
Fig. 11 is a side elevation of the stripping mechanism.
Fig. 13 is a detail view of the end of the support, by means of which the pivoted sections are held in a closed position, showing its attachment with the frame.
Figure 12:
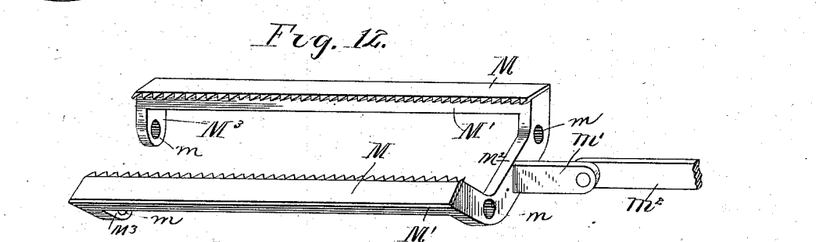
Fig. 12 is a detail view of the reciprocating knives which work in connection with the stripping-rolls.

The stripping mechanism consists of the two frame-pieces $i^2$ and $i^3$, secured to the frame of the machine by means of the bars or rods $i^4$ which pass from the frame $i^2$ to the frame $i^3$, and thence to the cross-bar or brace $A^2$ of the machine-frame, the rear bar $i^4$ passing directly through the frames, while the front bar is connected to them by means of the links K and by the adjustable arm $K^5$, which is secured to the cross-arm $A^2$. Journaled in the frames $i^2$ and $i^3$ are six, preferably rubber, rolls $K'$ arranged in sets of three each, and each set comprising the strippers $I^3$ and $I^4$, described before. The rolls $K'$ of each set are arranged so as to form a trough for the corn, and are inclined so that the ears of corn when placed therein will gravitate down such incline and out at the lower end. When this happens the corn will have been stripped of its husks. Located on the upper portion of the frames $i^2$ and $i^3$ and rigidly secured thereto are the scrapers $K^3$ and $K^4$. The scraper $K^4$ is triangular in cross-section and is arranged between the two sets of rolls so that one of its edges will operate on one set and one on the other set, while the two scrapers $K^3$ are located so that they will operate upon the outside rolls of each set, the whole being arranged so that they will lie parallel with the rolls, and as the corn is revolved between the latter they will operate to scrape the rolls and to prevent the corn and husks from following the rolls in the latter's revolutions. The rolls $K'$ are driven by power derived from the shaft $d'$, transmitted by means of a sprocket-wheel $k$ fixed to the shaft over which the chain $k'$ operates, and this chain passes up and over the sprockets $k^2$ and $k^3$ mounted respectively upon the extended shafts $k^4$ and L of the rolls $K^2$, the ends of said shafts being journaled in one of the cross-bars $A^2$ of the frame A. Fixed to the shafts $k^4$ is a pinion-gear $L'$ which meshes with the spur-gear $L^2$ fixed to the shaft $L^5$ of the roll adjacent to the one driven by the shafts $k^4$ whereby the said roll is driven, while the remaining roll of the strippers $I^3$ is driven by the gears $L^3$ and $L^4$ fixed to the shafts $k^4$ and $l$, Fig. 4, respectively. The rolls of the stripper $I^4$ are driven by the shafts L, which is in connection with the gears $l'$, $l^2$ and $l^3$ attached to the several shafts of the rolls comprised in said stripper. Thus the rolls $K'$ of the several strippers are made to revolve and to impart to the ear of corn in each a similar movement whereby the corn is subjected to the action of the stripping-rolls, and whereby the husks are torn off the ear. This will be more fully described hereinafter.

In order to still further prevent the husks and silk of the corn from becoming entangled with the rolls $K'$, we provide the cleaning-knives M, which are four in number, two for each stripper, and the cleaning-knives of each stripper are secured to the bars $M'$, which extend parallel with the rolls and are connected at their forward end by the rods $M^2$, while their rear ends are formed with the ears $M^3$. Secured rigidly to the frames $i^2$ and $i^3$ and extending parallel with each other and with the rolls $K'$ are the rods $M^4$, which are two for each stripper, and to which the bars $M'$ are connected by means of the perforations $m$, formed in the rods $M^2$ and ears $M^3$. This connection is a sliding one, so that the bars $M'$ and their attached knives will be allowed a reciprocating movement in a line parallel with the rolls $K'$. This reciprocating movement is attained by means of the arms $m'$, formed integral with the rods $M^2$ and projecting outwardly therefrom to the right. Pivotally connected to the ends of these arms are the pitmen $m^2$, which extend across the machine to the right-hand side, where they are connected to the crank-disks $m^3$, secured one to each end of the shaft $m^4$. Shaft $m^4$ is journaled in the parallel vertical rods N, secured to the frame of the machine and arranged between the disks $m^3$, and the shaft has fixed thereto between the rods N a large band-pulley $N'$, over which the band $N^2$ operates. The band $N^2$ extends upwardly to the drive-shaft $a$, and there it passes over the drive-pulley $N^3$. By this means the motion of the shaft $a$ is transmitted to the shaft $m^4$ and from thence to the knives M. The edges of these knives are roughened or toothed like those of a grass-cutter and lie flush with the under side of the rods, so that as fast as the husks and silk accumulate on the rolls it is cut off, and by means of a jet of water directed on the rolls they may be kept as clean and as free from gum as could possibly be necessary. $N^4$ indicates an auxiliary knife, which is fixed to the brace $n$ of the frames $i'$ and $i^2$ and which lies flush with one of the rolls and with one of the reciprocating knives M. This construction cuts the husks, &c., from the rolls more effectively than the reciprocating knives alone, but will not generally be needed, as the latter are perfectly efficient to remove all ordinary accumulations.

By reference to the drawings the operation of our invention may be traced as follows: The machine having been started by the application of power to the shaft $a$, and the several parts put in motion as before described, the operator or attendant first places an ear of corn on the endless belt $e$ between the slats thereon and allows it to pass under the drum or roll $E^8$ which holds it in such a position that its butt or the stalk end will be cut off by the rotary cutter $E^2$. The ear may then be reversed and its top cut off, though this is not essential. After the ear has been thus treated it is allowed to be carried rearwardly until the end of the carrier $e$ is reached, when it drops from such and onto the traveling belt or carrier $B^3$. When this belt is reached the ear will be dropped lengthwise on and between the two belts and will be carried by them to the rotary slitting-cutters $B'$ and $b^3$, between which it is passed and simultaneously cut lengthwise or longitudinally. As the ear passes to the left of the knives $B'$ and $b^3$ it is pushed, owing to the momentum gathered by it in the passage, under the curved arm G and onto the upper side of the lower half of the endless carrier $H^3$. By this latter device the corn is carried forward and dropped into the stripper that is related to the carrying device or section $k^3$ in which the corn is located, in accordance with the mode of operation before explained. Here the ear is caught between the rolls $K'$ and started to turning in the trough of the stripper, and as this progresses the husks and silk are grasped by the two rollers nearest (in each stripper) to the rear of the machine and torn off the ear. As soon as the ear reaches the rolls $K'$ it is started downwardly during the husking process, and when it reaches the lower side of the rolls it will drop off them. This completes the operation. The corn is fed to the carrier $e$, one ear between each two of the ribs thereon, and at this rate one ear will be fed to every one of the sections $h^3$ on the carrier $H^3$. This will keep every part of the machine engaged in the performance of its function during the operation above described.

It will be understood that we have provided two independent strippers and a peculiarly-constructed carrier only to increase the capacity of the machine, and that, if so desired, the number of the strippers may be reduced to one, or if the machine be constructed on a larger scale the strippers may be indefinitely increased. This will not change the gist of the invention.

Having thus described our invention, what we claim as new, and desire to secure by Letters Patent, is—

1. In a corn husking machine, the combination of a pair of oppositely disposed rotary cutters, yielding bearings for one of the said cutters, an endless carrier supported at one end upon the relatively fixed cutter and receiving motion therefrom, and stripping rollers arranged to grasp the slitted edges of the husks and strip them from the ears of corn by a pulling and tearing action, substantially as described.

2. In a corn husking machine, the combination of oppositely disposed rotary cutters, a yielding bearing for the upper cutter, and an endless conveyer mounted at one end on the lower cutter shaft and having portions disposed to travel on opposite sides of the said cutter, substantially as described.

3. In combination a cutter to remove the end of the husk, a conveyer to carry the ears of corn crosswise against the said cutter, a second cutter to slit the husk longitudinally, a second conveyer to carry the ears of corn lengthwise to the said second cutter, and stripping mechanism to remove the husk from the ear, substantially as described.

4. In combination two shafts disposed in parallel relation and connected to be positively rotated, one of the shafts being mounted in fixed bearings, the other in movable bearings, rotary cutters mounted on the ends of the shafts in coincident relation, an endless conveyer disposed to travel between the cutters, and a husk stripping mechanism, substantially as described.

5. The combination in a corn husking machine, of a circular husk cutting blade revolving upon a fixed axis, two parallel carrying belts operating on the axis of said cutter and arranged one on each side thereof, whereby a conveyer for carrying the corn to the blade is formed, and a second husk cutting blade operating with the first, substantially as described.

6. In a corn husking machine, the combination with a cutter for slitting the husk longitudinally of the ear, and a series of husk stripping mechanisms, of a conveyer to carry the ears of corn from the said cutter to the husk stripping mechanisms and depositing the ears alternately to the two sets of huskers, substantially as described.

7. In a corn husking machine, the combination with a cutter for slitting the husk longitudinally of the ear, and a series of husk stripping mechanisms, of a conveyer comprising a series of pivoted drop sections which receive the ears of corn after the husk is slit and carry it to the husk stripping mechanisms, and a support to sustain the pivoted sections and release them to drop the ears alternately to the husk stripping mechanisms, substantially as described.

8. A machine for husking corn, comprising the combination of a cutter, whereby the husks of the corn are cut or slitted, two stripping devices for removing the cut husks, a conveyer for carrying the corn from the cutter to the stripping devices, and a support at the lower side of the conveyer, whereby its carrying sections are prevented from dumping, the support having formed therein over the stripping devices two breaks or openings of such a size in relation to the carrying sections that every other section will be allowed to dump the corn into the first stripper, while the remaining sections are made to dump into the second stripper, substantially as described.

9. A machine for husking corn comprising the combination of a cutter for cutting the husks, a pair of rolls for stripping the husks from the ear, and a knife extending parallel with the rolls, and adapted to reciprocate simultaneously with the revolutions thereof, whereby the accumulation of husks, &c., are removed from the rolls, substantially as described.

10. In a corn husking machine, the combination with stripping rolls, of a reciprocating knife extending parallel with and adapted to remove the husks from a stripping roll, and a fixed knife parallel with the reciprocating knife and its stripping roll to supplement the action of the reciprocating knife, substantially as described.

In testimony whereof we affix our signatures in presence of two witnesses.

LAWRENCE S. CAMPBELL.
ISAAC WOODRING.

Witnesses:
J. Y. HAZLETT,
JAMES ADAIR.